United States Patent
Fu et al.

(10) Patent No.: US 11,057,824 B2
(45) Date of Patent: Jul. 6, 2021

(54) ACCESS CONTROL METHOD AND DEVICE

(71) Applicant: China Academy of Telecommunications Technology, Beijing (CN)

(72) Inventors: Jing Fu, Beijing (CN); Jing Liang, Beijing (CN); Yuan Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 107 days.

(21) Appl. No.: 16/476,246

(22) PCT Filed: Feb. 7, 2018

(86) PCT No.: PCT/CN2018/075650
§ 371 (c)(1),
(2) Date: Jul. 5, 2019

(87) PCT Pub. No.: WO2018/127233
PCT Pub. Date: Jul. 12, 2018

(65) Prior Publication Data
US 2019/0357120 A1    Nov. 21, 2019

(30) Foreign Application Priority Data
Jan. 6, 2017 (CN) .......................... 201710011184.5

(51) Int. Cl.
*H04W 48/10* (2009.01)
*H04W 4/08* (2009.01)
(Continued)

(52) U.S. Cl.
CPC ............. *H04W 48/10* (2013.01); *H04W 4/08* (2013.01); *H04W 48/16* (2013.01); *H04W 88/12* (2013.01); *H04W 84/042* (2013.01)

(58) Field of Classification Search
CPC ....... H04W 48/10; H04W 4/08; H04W 48/16; H04W 88/12; H04W 84/042;
(Continued)

(56) References Cited

U.S. PATENT DOCUMENTS

2006/0176881 A1* 8/2006 Ma ......................... H04W 4/08
                                                          370/392
2013/0339438 A1* 12/2013 Cherian ................ H04W 8/186
                                                          709/204
2015/0289195 A1* 10/2015 Gogic ............... H04W 74/0833
                                                          370/230

FOREIGN PATENT DOCUMENTS

CN        102469547 A        5/2012
CN        102740493 A       10/2012
(Continued)

*Primary Examiner* — Kiet Tang
(74) *Attorney, Agent, or Firm* — Foley & Lardner LLP (57) ABSTRACT

An access control and device for enhancing the extendibility of access control mechanisms, thereby further facilitating the extendibility of access control methods and types for the diversified development of terminal types and service types. The access control method comprises: a user equipment (UE) determines an access control group set including access control target information; the UE determines the access control parameter corresponding to the access control group set; the UE performs access control according to the access control parameter.

16 Claims, 3 Drawing Sheets

(51) Int. Cl.
*H04W 48/16* (2009.01)
*H04W 88/12* (2009.01)
*H04W 84/04* (2009.01)

(58) Field of Classification Search
CPC ..... H04W 48/02; H04W 48/12; H04W 28/02; H04W 28/0215; H04W 28/0289
See application file for complete search history.

(56) References Cited

FOREIGN PATENT DOCUMENTS

| | | |
|---|---|---|
| CN | 102892180 A | 1/2013 |
| CN | 104322108 A | 1/2015 |
| CN | 104717693 A | 6/2015 |
| WO | WO-2011/037395 A2 | 9/2016 |
| WO | WO-2016/134760 A1 | 9/2016 |

\* cited by examiner

ACCESS CONTROL METHOD AND DEVICE

This application is a National Stage of International Application No. PCT/CN2018/075650, filed Feb. 7, 2018, which claims priority to Chinese Patent Application No. 201710011184.5, filed Jan. 6, 2017, both of which are hereby incorporated by reference in their entireties.

FIELD

The present invention relates to the field of display technologies, and particularly to an access control method and device.

BACKGROUND

Access control mechanisms in a Long Term Evolution (LTE) system in the prior art include following mechanisms.

1. An Access Class Barring (ACB) mechanism in which an access control is enforced based upon an access type (e.g., mobile originating data or mobile originating signaling), and an Access Class (AC) of a User Equipment (UE).

2. An ACB skip mechanism in which access control is skipped for voice, video, and Short Message Service (SMS) in the Multi-Media Telephony (MMTEL) service standard to thereby prioritize an access to the voice, the video, and the SMS.

3. A Service Specific Access Control (SSAC) mechanism in which access control is enforced for MMTEL voice or an MMTEL video call initiated by a UE, and which is applicable in both an idle state and a connected state (including a light connection of the connected state).

4. An Extended Access Barring (EAB) mechanism which is an access control mechanism introduced for machine type communication.

5. An Access Barring (AB) mechanism for a Narrow Band Internet of Things (NB-IoT).

6. An Application specific Congestion control for Data Communication (ACDC) mechanism in which access control is enforced for an application identified by an operator.

Where, an access decision mechanism in a non-NB-IoT is as follows.

The Access Stratum (AS) at the UE side obtains an access control parameter from a System Information Block (SIB) 2.

The AS at the UE side enforces SSAC access control in response to a request of a higher layer (an IMS layer), and delivers a related indication to the higher layer.

The AS at the UE side to trigger a Radio Resource Control (RRC) Connection Setup or Resume procedure makes an access control decision in an order of EAB, ACDC, ACB skip, and ACB. If a decision result is barring, then the UE will notify a related layer, and stop the related RRC procedure; otherwise, the UE will trigger the related RRC procedure.

In the LTE system, for EAB, the access control parameter broadcasted by the network side includes a Public Land Mobile Network (PLMN) of the UE, an EAB category, and a barring bitmap. The UE determines the barring bitmap according to the PLMN of the UE and the EAB category, and determines whether a bit, in the barring bitmap, corresponding to an Access Control (AC) class of the UE is 0 or 1, and if the bit is 1, then the UE will not be allowed for an access; and for ACDC and ACB, the network side configures a bar factor and a bar timer, the UE compares a randomly generated random number with the bar factor, and if the random number is greater than the bar factor, then the UE will be barred, and a timing length of time of the bar timer will be calculated.

In summary, in the prior art, as the wireless communication systems are advancing, and types of UE and types of services are being diversified, there are more and more modes and types for which access control is required, but it is inflexible to extend the existing access control mechanisms.

SUMMARY

Embodiments of the invention provide an access control method and device so as to improve the extensibility of an access control mechanism to thereby make it more convenient to extend the mode and type of the access control mechanism for a growing diversity of types of UE and types of services.

In a first aspect, an embodiment of the invention provides an access control method including:

determining, by a User Equipment (UE), an access control group set including access control object information;

determining, by the UE, an access control parameter corresponding to the access control group set; and enforcing, by the UE, access control according to the access control parameter.

With this method, the UE determines an access control group set including access control object information, determines an access control parameter corresponding to the access control group set, and enforces control according to the access control parameter, where in order to extend an access control object, the access control group set including the access control object information can be extended directly, and access control can be enforced using the access control parameter corresponding to the access control group set, thus improving the extensibility of an access control mechanism to thereby make it more convenient to extend the mode and the type of access control mechanism for a growing diversity of types of UEs and types of services.

Optionally, if the UE does not determine any access control parameter corresponding to the access control group set according to the access control group set, then the UE will be allowed for an access.

Optionally, the access control group set includes the access control object information which is an access control group index representing an access control object.

Optionally, the UE determines the access control group index in one or a combination of following approaches:

determining, by the UE, an access control group index of a current access control object according to a predefined access control group index corresponding to an access control object; or obtaining, by the UE, a correspondence relationship between an access control object and an access control group index from a network side, and determining an access control group index of a current access control object according to the correspondence relationship.

Optionally, the predefined access control group index corresponding to the access control object is specified in a protocol, or configured in a Universal Subscriber Identity Module (USIM).

Optionally, an Access Stratum (AS) of the UE determines the access control group index of the current access control object according to a predefined access control group index corresponding to an access control object; or an Access Stratum (AS) of the UE obtains a correspondence relationship between an access control object and an access control group index from a network side, and determines the access control group index of the current access control object according to the correspondence relationship; or a higher layer of the UE determines the access control group index of the current access control object according to a predefined access control group index corresponding to an access control object, and transmits the access control group index of the current access control object to an Access Stratum (AS) of the UE; or a higher layer of the UE obtains a correspondence relationship between an access control object and an access control group index from a network side, determines the access control group index of the current access control object according to the correspondence relationship, and transmits the access control group index of the current access control object to an Access Stratum (AS) of the UE.

Optionally, the access control group set further includes one or a combination of:
 a Public Land Mobile Network (PLMN) of the UE;
 a Radio Resource Control (RRC) state of the UE;
 a network slice of the UE;
 an access class of the UE; or
 a device type of the UE.

Optionally, the UE determines the access control parameter corresponding to the access control group set according to a pre-stored correspondence relationship between an access control group set and an access control parameter.

Optionally, the correspondence relationship is obtained by the UE from the network side.

Optionally, when the UE determines a plurality of access control group indexes, if the UE determines an access control parameter corresponding to an access control group index with a highest priority in a preset priority order, then the UE is allowed for an access, or if there is no access control parameter corresponding to the access control group index with the highest priority, then the UE further determines whether there is an access control parameter corresponding to another access control group index, and if so, then the UE enforces access control according to the determined access control parameter; or if the UE determines a corresponding access control parameter for each determined access control group index, then the UE enforces access control according to the determined access control parameter; or if the UE does not determine any corresponding access control parameter for each determined access control group index, then the UE is allowed for an access.

Optionally, the method further includes: categorizing the access control group indexes into several categories in advance, wherein the preset priority order is a priority order of the categories of the access control group indexes.

Optionally, different access control group indexes are allocated for different access control objects in advance in one or a combination of following approaches:
 different access control objects are grouped and allocated with different access control group indexes according to different communication trigger types;
 different access control objects are grouped and allocated with different access control group indexes according to different types of services;
 different access control objects are grouped and allocated with different access control group indexes according to different types of data bearers; or
 different access control objects are grouped and allocated with different access control group indexes according to different service port numbers or different Transmission Control Protocol (TCP) port numbers.

In a second aspect, an embodiment of the invention provides an access control method including:
 determining, by a network side, a correspondence relationship between an access control group set including access control object information of a User Equipment (UE), and an access control parameter; and
 transmitting, by the network side, information about the correspondence relationship to the UE.

Optionally, transmitting, by the network side, the information about the correspondence relationship to the UE includes:
 transmitting, by the network side, the correspondence relationship to the UE; or
 transmitting, by the network side, an access control parameter corresponding to each access control group set respectively to the UE according to a default arrangement pattern of access control group sets.

Optionally, the method further includes:
 transmitting, by the network side, a correspondence relationship between an access control object of the UE, and an access control group index to the UE;
 wherein at least one access control object corresponds to a group of access control group indexes.

Optionally, the correspondence relationship between an access control object of the UE, and an access control group index is determined by a base station of the network side according to a pre-configuration, or obtained from an Operation, Administration, and Maintenance (OAM) entity, and transmitted to the UE by the base station of the network side.

In a third aspect, an embodiment of the invention provides an access control device including:
 a first unit configured to determine an access control group set including access control object information of a UE;
 a second unit configured to determine an access control parameter corresponding to the access control group set; and
 a third unit configured to enforce access control according to the access control parameter.

Optionally, if the second unit does not determine any access control parameter corresponding to the access control group set according to the access control group set, then the third unit will allow the UE for an access.

Optionally, the access control group set includes the access control object information which is an access control group index representing an access control object.

Optionally, the first unit determines the access control group index in one or a combination of following approaches:
 determining an access control group index of a current access control object according to a predefined access control group index corresponding to an access control object; or
 obtaining a correspondence relationship between an access control object and an access control group index from a network side, and determining an access control group index of a current access control object according to the correspondence relationship.

Optionally, the predefined access control group index corresponding to the access control object is specified in a protocol, or configured in a Universal Subscriber Identity Module (USIM) of the UE side.

Optionally, the first unit is an Access Stratum (AS) of the UE; and the AS determines the access control group index of the current access control object according to a predefined access control group index corresponding to an access control object; or the AS obtains a correspondence relationship between an access control object and an access control group index from a network side, and determines the access control group index of the current access control object according to the correspondence relationship; or a higher layer of the UE determines the access control group index of the current access control object according to a predefined access control group index corresponding to an access control object, and transmits the access control group index of the current access control object to the AS of the UE; or a higher layer of the UE obtains a correspondence relationship between an access control object and an access control group index from a network side, determines the access control group index of the current access control object according to the correspondence relationship, and transmits the access control group index of the current access control object to the AS of the UE.

Optionally, the access control group set further includes one or a combination of:

a Public Land Mobile Network (PLMN) of the UE;
a Radio Resource Control (RRC) state of the UE;
a network slice of the UE;
an access class of the UE; or
a device type of the UE.

Optionally, the second unit determines the access control parameter corresponding to the access control group set according to a pre-stored correspondence relationship between an access control group set and an access control parameter.

Optionally, the correspondence relationship is obtained by the second unit from the network side.

Optionally, when the first unit determines a plurality of access control group indexes, if the second unit determines an access control parameter corresponding to an access control group index with a highest priority in a preset priority order, then the third unit allows the UE for an access, or if there is no access control parameter corresponding to the access control group index with the highest priority, then the second unit further determines whether there is an access control parameter corresponding to another access control group index, and if so, then the third unit enforces access control according to the determined access control parameter; or if the second unit determines a corresponding access control parameter for each determined access control group index, then the third unit enforces access control according to the determined access control parameter; or if the second unit does not determine any corresponding access control parameter for each determined access control group index, then the third unit allows the UE for an access.

Optionally, the access control group indexes are categorized into several categories; and the preset priority order is a priority order of the categories of the access control group indexes.

Optionally, access control objects represented by access control group indexes are preset in advance in one or a combination of following approaches:

different access control objects are grouped and allocated with different access control group indexes according to different communication trigger types;

different access control objects are grouped and allocated with different access control group indexes according to different types of services;

different access control objects are grouped and allocated with different access control group indexes according to different types of data bearers; or different access control objects are grouped and allocated with different access control group indexes according to different service port numbers or different Transmission Control Protocol (TCP) port numbers.

In a fourth aspect, an embodiment of the invention provides an access control device including:

a determining unit configured to determine a correspondence relationship between an access control group set including access control object information of a User Equipment (UE), and an access control parameter; and a transmitting unit configured to transmit information about the correspondence relationship to the UE.

Optionally, the transmitting unit is configured to transmit the information about the correspondence relationship to the UE by:

transmitting the correspondence relationship to the UE; or transmitting an access control parameter corresponding to each access control group set respectively to the UE according to a default arrangement pattern of access control group sets.

Optionally, the transmitting unit is further configured to transmit a correspondence relationship between an access control object of the UE, and an access control group index to the UE;

wherein at least one access control object corresponds to a group of access control group indexes.

Optionally, the correspondence relationship between an access control object of the UE, and an access control group index is determined by the transmitting unit according to a pre-configuration, or obtained from an Operation, Administration, and Maintenance (OAM) entity, and transmitted to the UE by the transmitting unit.

In a fifth aspect, an embodiment of the invention provides an access control device including: a processor, a memory, and a transceiver, wherein:

the processor is configured to read and execute programs in the memory to:

determine an access control group set including access control object information of a UE;

determine an access control parameter corresponding to the access control group set; and enforce access control according to the access control parameter.

Optionally, if the processor does not determine any access control parameter corresponding to the access control group set according to the access control group set, then the processor will allow the UE for an access.

Optionally, the access control group set includes the access control object information which is an access control group index representing an access control object.

Optionally, the processor determines the access control group index in one or a combination of following approaches:

determining an access control group index of a current access control object according to a predefined access control group index corresponding to an access control object; or obtaining a correspondence relationship between an access control object and an access control group index from a network side, and determining an access control group index of a current access control object according to the correspondence relationship.

Optionally, the predefined access control group index corresponding to the access control object is specified in a protocol, or configured in a Universal Subscriber Identity Module (USIM) of the UE side.

Optionally, the processor is an Access Stratum (AS) of the UE; and the AS determines the access control group index of the current access control object according to a predefined access control group index corresponding to an access control object; or the AS obtains a correspondence relationship between an access control object and an access control group index from a network side, and determines the access control group index of the current access control object according to the correspondence relationship; or a higher layer of the UE determines the access control group index of the current access control object according to a predefined access control group index corresponding to an access control object, and transmits the access control group index of the current access control object to the AS of the UE; or a higher layer of the UE obtains a correspondence relationship between an access control object and an access control group index from a network side, determines the access control group index of the current access control object according to the correspondence relationship, and transmits the access control group index of the current access control object to the AS of the UE.

Optionally, the access control group set further includes one or a combination of:

a Public Land Mobile Network (PLMN) of the UE;
a Radio Resource Control (RRC) state of the UE;
a network slice of the UE;
an access class of the UE; or
a device type of the UE.

Optionally, the processor determines the access control parameter corresponding to the access control group set according to a pre-stored correspondence relationship between an access control group set and an access control parameter.

Optionally, the correspondence relationship is obtained by the processor from the network side.

Optionally, when the processor determines a plurality of access control group indexes, if the processor determines an access control parameter corresponding to an access control group index with a highest priority in a preset priority order, then the processor allows the UE for an access, or if there is no access control parameter corresponding to the access control group index with the highest priority, then the processor further determines whether there is an access control parameter corresponding to another access control group index, and if so, then the processor enforces access control according to the determined access control parameter; or if the processor determines a corresponding access control parameter for each determined access control group index, then the processor enforces access control according to the determined access control parameter; or if the processor does not determine any corresponding access control parameter for each determined access control group index, then the processor allows the UE for an access.

Optionally, the access control group indexes are categorized into several categories; and the preset priority order is a priority order of the categories of the access control group indexes.

Optionally, access control objects represented by access control group indexes are preset in advance in one or a combination of following approaches:

different access control objects are grouped and allocated with different access control group indexes according to different communication trigger types;

different access control objects are grouped and allocated with different access control group indexes according to different types of services;

different access control objects are grouped and allocated with different access control group indexes according to different types of data bearers; or different access control objects are grouped and allocated with different access control group indexes according to different service port numbers or different Transmission Control Protocol (TCP) port numbers.

In a sixth aspect, an embodiment of the invention provides an access control device including: a processor, a memory, and a transceiver, wherein:

the processor is configured to read and execute programs in the memory to:

determine a correspondence relationship between an access control group set including access control object information of a User Equipment (UE), and an access control parameter; and transmit information about the correspondence relationship to the UE through the transceiver.

Optionally, the processor is configured to transmit the information about the correspondence relationship to the UE through the transceiver by:

transmitting the correspondence relationship to the UE; or
transmitting an access control parameter corresponding to each access control group set respectively to the UE according to a default arrangement pattern of access control group sets.

Optionally, the processor is further configured to transmit a correspondence relationship between an access control object of the UE, and an access control group index to the UE;

wherein at least one access control object corresponds to a group of access control group indexes.

Optionally, the correspondence relationship between an access control object of the UE, and an access control group index is determined by the processor according to a pre-configuration, or obtained from an Operation, Administration, and Maintenance (OAM) entity, and transmitted to the UE by the processor.

In a seventh aspect, an embodiment of the invention provides a readable storage medium including program codes configured to, upon being executed on a computing device, cause the computing device to perform the method according to any one of the solutions in the first aspect, or the method according to any one of the solutions in the second aspect.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described below illustrate only some embodiments of the invention, and those ordinarily skilled in the art can further derive other drawings from these drawings without any inventive effort.

DETAILED DESCRIPTION OF THE EMBODIMENTS

The embodiments of the invention provide an access control method and device so as to improve the extensibility of an access control mechanism to thereby make it more convenient to extend the modes and types of the access control mechanism for a growing diversity of types of UE and types of services.

As the wireless communication systems are developing and types of UE and types of services are being diversified, there are more and more modes and types for which access control is required, thus complicating an access control mechanism. An embodiment of the invention provides an access control method so as to provide a uniform, simple, and highly extensible access control mechanism.

Figure 1:
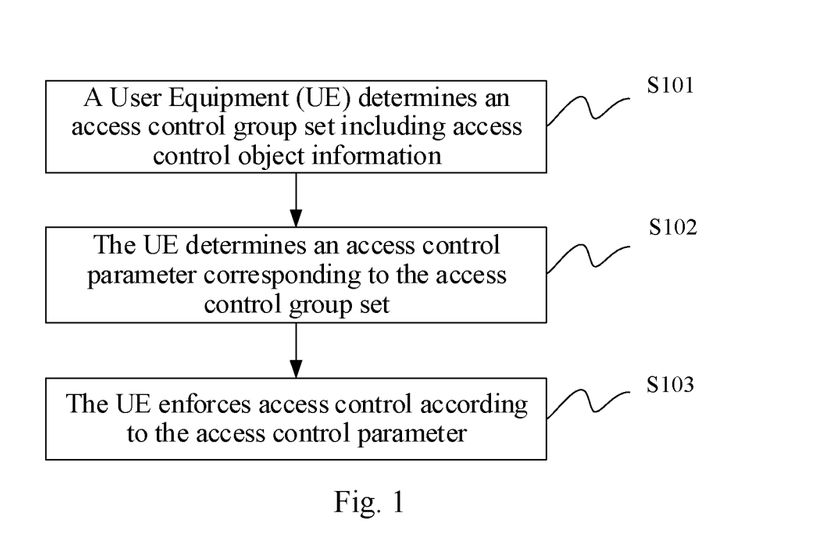
FIG. 1 is a schematic flow chart of an access control method at a UE side according to an embodiment of the invention.

As illustrated in FIG. 1, an access control method at a UE side according to an embodiment of the invention includes the following operations.

In the operation S101, a User Equipment (UE) determines an access control group set including access control object information.

In the operation S102, the UE determines an access control parameter corresponding to the access control group set.

In the operation S103, the UE enforces access control according to the access control parameter.

For example, an Access Stratum (AS) of the UE finds the corresponding access control parameter according to the obtained access control group set including the access control object information, and further makes an access control decision using the access control parameter.

Here, the access control group set includes the following access control object information: an access control group index representing an access control object.

The access control group set further includes one or a combination of the following access control object information: a PLMN of the UE; an RRC state of the UE; a network slice of the UE; an access class of the UE; or a device type of the UE.

Stated otherwise, the access control group set includes the access control group index, and may further include one of the following combinations.

A PLMN of the UE.

Or, an RRC state of the UE.

Or, a network slice of the UE.

Or, the access control group index, a PLMN of the UE, and an RRC state of the UE.

Or, the access control group index, a PLMN of the UE, and a network slice of the UE.

Or, the access control group index, an RRC state of the UE, and a network slice of the UE.

Or, the access control group index, a PLMN of the UE, an RRC state of the UE, and a network slice of the UE.

Or, the access control group index, a PLMN of the UE, an RRC state of the UE, a network slice of the UE, and an access class of the UE.

Or, the access control group index, a PLMN of the UE, an RRC state of the UE, a network slice of the UE, an access class of the UE, and a device type of the UE; etc.

Here, the Access Class (AC) of the UE is one of classes 0 to 14, for example.

The device type of the UE is one of an Internet of Things device, a normal device, etc.

The access control group set can be determined in one of the following implementations: a higher layer of the UE provides it to the AS; or the AS obtains it from the network side; or the higher layer provides it to the AS, and the AS obtains it from the network side.

Stated otherwise, the implementations are as follows.

The Access Stratum (AS) of the UE determines an access control group index of a current access control object according to a predefined access control group index corresponding to an access control object.

Or, the Access Stratum (AS) of the UE obtains a correspondence relationship between an access control object and an access control group index from the network side, and determines an access control group index of a current access control object according to the correspondence relationship.

Or, the higher layer of the UE determines an access control group index of a current access control object according to a predefined access control group index corresponding to an access control object, and transmits the access control group index of the current access control object to the Access Stratum (AS) of the UE.

Or, the higher layer of the UE obtains a correspondence relationship between an access control object and an access control group index from the network side, determines an access control group index of a current access control object according to the correspondence relationship, and transmits the access control group index of the current access control object to the Access Stratum (AS) of the UE.

Where, a definition of an access control group index, i.e. an access control object (including a type of UE, a type of service, etc.) represented by the access control group index, can be implemented as follows.

A definition corresponding to each access control group index is specified in a protocol.

Or, a definition of an access control group index is obtained according to a configuration, where the configuration at the UE side can be a configuration stored in a Universal Subscriber Identity Module (USIM), or a configuration received from the network side.

Or, for the network side, e.g., a base station under a New Radio Access Technology (New RAT, NR) (i.e. gNB), a definition of an access control group index can be predefined, or a definition corresponding to each access control group index can be configured and transmitted by an Operation, Administration, and Maintenance (OAM) entity to the gNB.

Moreover, in the embodiment of the invention, when the UE determines a plurality of access control group indexes, if the UE determines an access control parameter corresponding to an access control group index with the highest priority in a preset priority order, then the UE will be allowed for an access, or if there is no access control parameter corresponding to the access control group index with the highest priority, then the UE will further determine whether there is an access control parameter corresponding to another access control group index, and if so, then the UE will enforce access control according to the determined access control parameter.

Or, if the UE determines a corresponding access control parameter for each determined access control group index, then the UE will enforce access control according to each determined access control parameter.

Or, if the UE determines a plurality of access control group indexes, and the UE does not determine a corresponding access control parameter for each determined access control group index, then the UE will be allowed for an access; and if the UE determines only one access control group index, and the UE does not determine an access control parameter corresponding to the access control group index, then the UE will be also allowed for an access.

Here, the UE can determine a corresponding access control parameter for each access control group index respectively in a preset priority order (which can be an ascending or descending order of the access control group indexes).

Moreover, in the embodiment of the invention, the access control group indexes can alternatively be categorized in advance into a plurality of categories, so the preset priority order can be a priority order of the categories of the access control group indexes.

Figure 2:
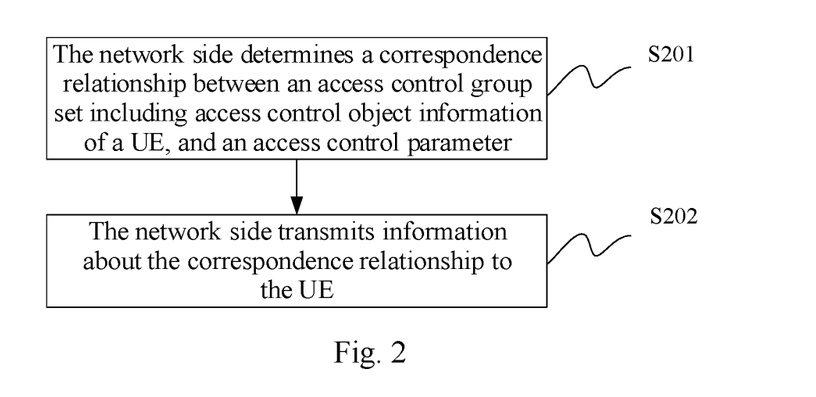
FIG. 2 is a schematic flow chart of an access control method at a network side according to an embodiment of the invention.

Corresponding, as illustrated in FIG. 2, an access control method at the network side according to an embodiment of the invention includes the following operations.

In the operation S201, the network side determines a correspondence relationship between an access control group set including access control object information of a UE, and an access control parameter.

In the operation S202, the network side transmits information about the correspondence relationship to the UE.

Optionally, the network side transmits the information about the correspondence relationship to the UE as follows: the network side transmits the correspondence relationship to the UE; or the network side transmits an access control parameter corresponding to each access control group set to the UE respectively according to a default arrangement pattern of access control group sets.

Optionally, the method further includes: the network side transmits a correspondence relationship between an access control object of the UE and an access control group index to the UE; here at least one access control object corresponds to a group of access control group indexes.

Optionally, the correspondence relationship between an access control object of the UE and an access control group index is determined by a base station at the network side according to a pre-configuration, or obtained from the OAM entity and then transmitted to the UE, by the base station.

Several embodiments will be described below in details.

In a first embodiment, a higher layer of the UE provides an access control group index to the AS of the UE.

In this embodiment, an access control group set only includes an access control group index; and a definition or a condition corresponding to each access control group index, i.e., an access control object corresponding to each access control group index, is specified in a higher-layer protocol.

For example, as defined in the higher-layer protocol, an index 0 indicates that the UE is paged, an index 1 indicates that the UE initiates an urgent call, an index 2 indicates that the UE initiates normal data, an index 3 indicates that the UE initiates Non-Access Stratum (NAS) signaling, an index 4 indicates that the UE initiates an MMTEL voice service, an index 5 indicates that the UE initiates an MMTEL video service, an index 6 indicates a default index, etc.

A condition corresponding to each access control group index can be specified in the higher-layer protocol according to a configuration in a USIM, or a configuration sent from the network side.

An access control method according to this embodiment includes the following operations.

In the first operation, the AS of the UE receives and stores a correspondence relationship, transmitted by the base station, between an access control group set including access control object information, and an access control parameter (where the correspondence relationship can be referred simply to as an access control parameter configuration).

The access control parameter configuration transmitted by the base station can include the following implementations.

In a first implementation, each access control group set corresponds to a list of a group of access control group indexes as follows, for example.

A list of access control group indexes for an access which is not barred is {index 0, index 1}.

A list of access control group indexes corresponding to a barring bitmap (1001011000) is {index 2, index 4}.

A list of access control group indexes corresponding to a barring bitmap (000110000) is {index 3, index 5}.

The list of access control group indexes can alternatively be a corresponding range of access control group indexes represented as a start index pulse an index range, and for example, a start index is 0, and an index range is 3, so the index 0, the index 1, and the index 2 correspond to the same access control parameter.

In a second implementation, a corresponding set of access control parameter is configured in a default ascending order of access control group indexes.

For example, in a list of access control configuration parameters received by the UE, the first bar configuration is False (i.e., Not Barred), an access is allowed, and a corresponding index is 1 (an access is allowed for the index 0 by default); the second bar configuration is a barring bitmap (1001011000), and a corresponding index is 2; the third bar configuration is a barring bitmap (000110000), and a corresponding index is 3; the fourth bar configuration is a barring bitmap (1001011000), and a corresponding index is 4; and the fifth bar configuration is a barring bitmap (000110000), and a corresponding index is 5.

Moreover, in the embodiment of the invention, access control objects can be grouped (or categorized) particularly in one or a combination of the following implementations.

Different access control objects are grouped and allocated with different access control group indexes according to different communication trigger types; and for example, an access control object is a called UE, so a corresponding access control group index is 1; an access control object is a UE initiating a urgent call, so a corresponding access control group index is 2; etc.

Or, different access control objects are grouped and allocated with different access control group indexes according to different types of services; and for example, an access control object is a voice service, so a corresponding access control group index is 8; an access control object is a video service, so a corresponding access control group index is 9;

an access control object is a normal Internet access service, so a corresponding access control group index is 10; etc.

Or, different access control objects are grouped and allocated with different access control group indexes according to different types of data bearers; and for example, an access control object is a data bearer 1, so a corresponding access control group index is 10; an access control object is a data bearer 2, so a corresponding access control group index is 11; etc.

Or, different access control objects are grouped and allocated with different access control group indexes according to different service port numbers or Transmission Control Protocol (TCP) port numbers; and for example, an access control object is a service port number (or a TCP port number) of 80 (http) or 21 (ftp), so a corresponding access control group index is 16; etc.

In the second operation, the higher layer of the UE (including the NAS and the application layer) determines a definition corresponding to an access control group index according to a definition corresponding to each access control group index specified in a protocol, or a configuration in a USIM, or a configuration sent from the network side; notifies the AS of the UE of a corresponding index, and triggers the AS of the UE to enforce access control.

For example, the NAS of the UE is going to transmit normal data, and as specified in the protocol, an access control group index corresponding to the normal data transmission service is the index 2.

It shall be noted that, the base station also needs to know the definition corresponding to each access control group index in the first operation, and particularly the base station can obtain the definition corresponding to each access control group index according to the definition corresponding to each access control group index specified in the protocol, or according to a configuration of an OAM entity.

In the third operation, the AS of the UE searches for an access control parameter corresponding to the obtained access control group index according to the obtained access control group index, and the stored access control parameter configuration.

For example, the AS of the UE determines a barring bitmap corresponding to the index 2 as (1001011000).

In the fourth operation, the AS of the UE makes an access control decision according to the access control parameter determined in the third operation, and particularly can make the decision as in the existing LTE decision mechanism, so a repeated description thereof will be omitted here.

In a second embodiment, the AS of the UE determines an access control group index under a rule.

In this embodiment, an access control group set includes an access control group index, a PLMN of the UE, and an RRC state of the UE. There are two PLMNS (PLMN1 and PLMN2) in a network, and RRC states of the UE include idle, inactive, and connected states.

The AS of the UE obtains an access control group index corresponding to a current access control object according to a definition corresponding to each access control group index specified in a protocol, or as a result of interaction with the network side.

An access control method according to this embodiment includes the following operations.

In the first operation, the AS of the UE receives and stores an access control parameter configuration transmitted by the eNB.

In the access control parameter configuration transmitted by the eNB, each access control group set can correspond to a list of a group of access control group sets.

For example, an access control group set corresponding to a barred access is {(index 3, PLMN2, all states)}, where all states include all the RRC idle, inactive, and connected states of the UE.

A list of access control group indexes corresponding to a barring bitmap (1001011000) is {(index 2, PLMN1, all states), (index 4, all PLMNs, idle)}.

A list of access control group indexes corresponding to a barring bitmap (000110000) is {(index 3, PLMN1, all states), (index 4, all PLMNs, inactive), (index 5, all PLMNs, idle)}.

In the second operation, the AS of the UE side to enforce access control can obtain a corresponding access control group index under the rule as follows.

In a first implementation, the AS obtains the corresponding access control group index according to the definition corresponding to each access control group index specified in the protocol.

For example, as defined in the protocol, the index 0 indicates that the UE is paged, the index 1 indicates that the UE initiates an urgent call, the index 2 indicates that the UE initiates normal data, the index 3 indicates that the UE initiates NAS signaling, the index 4 indicates that the UE initiates an MMTEL voice service, the index 5 indicates that the UE initiates an MMTEL video service, etc.

In a second implementation, the AS obtains the corresponding access control group index according to a definition corresponding to a part of the access control group indexes specified in the protocol, where if the received access control parameter configuration includes another access control group index, but a definition related thereto is not stored at the AS of the UE, then the AS of the UE will further obtain the definition of the corresponding index from the network side (in a uni-cast, multicast, or group-cast mode).

For example, as defined in the protocol, the index 0 indicates that the UE is paged, the index 1 indicates that the UE initiates an urgent call, the index 2 indicates that the UE initiates normal data, the index 3 indicates that the UE initiates NAS signaling, and the index 4 indicates that the UE initiates an MMTEL voice service, but for the index 5, there is no definition, corresponding to the index 5, transmitted from the network side, so the AS of the UE will further obtain the definition of the index 5 from the network side, and for example, the index 5 is defined as an MMTEL video service.

It shall be noted that, the base station also needs to know the definition corresponding to each access control group index in the first operation, and can obtain the definition corresponding to each access control group index according to the definition corresponding to each access control group index specified in the protocol, or according to a configuration of an OAM entity.

In the third operation, the AS of the UE searches for a corresponding access control parameter according to the access control group set including the access control group index, the corresponding PLMN, and the corresponding RRC state.

For example, an access control parameter corresponding to an access control group set (index 3, PLMN1, idle) is "barred", and an access control parameter corresponding to an access control group set (index 4, PLMN1, idle) is a barring bitmap (1001011000). And if no corresponding access control parameter is found, then the access control group set will not be barred by default, and an access will be allowed.

In the fourth operation, the AS of the UE makes an access control decision according to the corresponding access control parameter.

In a third embodiment, the higher layer and the AS of the UE determines an access control group index under a rule.

In this embodiment, an access control group set includes an access control group index and a corresponding network slice. For example, there are two network slices in total in the current network.

An access control method according to this embodiment includes the following operations.

In the first operation, the AS of the UE receives and stores an access control parameter configuration transmitted by the eNB.

In the access control parameter configuration transmitted by the eNB, each access control group set can correspond to a list of a group of access control group sets.

For example, an access control group set corresponding to a barred access is {(index 3, all network slices)}.

A list of access control group indexes corresponding to {bar factor of 0.3, bar timer of 8 s} is {(index 2, all network slices), (index 4, network slice 1)}.

A list of access control group indexes corresponding to {bar factor of 0.4, bar timer of 16 s} is {(index 3, all network slices), (index 4, network slice 2)}.

In the second operation, when the AS of the UE side is going to enforce access control, the higher layer or the AS of the UE obtains the corresponding access control group index under the rule.

For example, the application layer of the UE to initially initiate a related application each time provides the AS of the UE side with a related access control group index to trigger the AS of the UE side to enforce access control; and the application layer of the UE can determine the corresponding access control group index according to respective conditions corresponding to access control group indexes defined in the protocol; or can obtain the corresponding access control group index corresponding to the application according to a related configuration in a USIM, or a corresponding configuration obtained from the network side.

If the AS is triggered by the NAS to perform a related RRC procedure, then the NAS will determine the corresponding access control group index according to respective conditions corresponding to access control group indexes defined in the protocol.

If related uplink (UL) data or signaling transmission is triggered by the AS itself, and access control is to be enforced, then the AS will determine the corresponding access control group index according to respective conditions (or definitions, i.e., access control objects) corresponding to access control group indexes defined in the protocol.

It shall be noted that, the base station also needs to know the definition corresponding to each access control group index in the first operation, and particularly can obtain the definition corresponding to each access control group index according to the definition corresponding to each access control group index specified in the protocol, or according to a configuration from an OAM entity.

In the third operation, the AS of the UE searches for a corresponding access control parameter according to an access control group set including the access control group index and the current network slice.

For example, an access control parameter corresponding to an access control group set (index 3, network slice 1) is "barred", and an access control parameter corresponding to an access control group set (index 4, network slice 2) is {bar factor of 0.4, bar timer of 16 s}. If no corresponding access control parameter is found, then the access control group set will not be barred by default, and an access will be allowed.

In the fourth operation, the AS of the UE makes an access control decision according to the corresponding access control parameter.

In a fourth embodiment, the AS of the UE may obtain a plurality of access control group indexes.

In this embodiment, access control group indexes are categorized into two categories, where the first category relates to communication types, and for example, the index 1 in the first category represents a urgent call, the index 2 in the first category represents a called UE service, the index 3 in the first category represents a UE originating service, etc.; and the second category relates to business type indexes or service type indexes, and for example, the index 1 in the second category represents a voice service, the index 2 in the second category represents a short message service, etc.

An access control method according to this embodiment includes the following operations.

In the first operation, the AS of the UE receives and stores an access control parameter configuration transmitted by the eNB.

In the second operation, when the AS of the UE is going to enforce access control, the higher layer or the AS of the UE obtains an access control group index corresponding to a current access control object under a preset rule, and at this time, there are the following two instances.

Only one access control group index may be determined, so the AS of the UE finds a corresponding access control parameter according to the access control group set (including the access control group index and possibly other information), and makes an access control decision; and if no corresponding access control parameter is found, then the UE will be allowed for an access.

Alternatively, two access control group indexes may be determined. For example, the UE in the idle state needs to initiate a voice service, and at this time, the UE corresponds to both a UE originating service (the index 3 in the first category) and a voice service (the index 1 in the second category). At this time, the UE can firstly determine an access control result according to the business type index or the service type index (the index 1 in the second category), and if an access control parameter corresponding to the index is found, then the UE will enforce access control according to the access control parameter, or it will be determined directly that the UE is allowed for an access; and if no access control parameter corresponding to the index is found, then the UE will further determine an access control result according to the communication type index (the index 3 in the first category). For example, if the UE firstly finds an access control parameter corresponding to the index 1 in the second category according to the index, then the UE will enforce access control according to the access control parameter, or it will be determined directly that the UE is allowed for an access (because the UE has previously made an access control decision according to the business type or the service type alone); and if the UE does not find any access control parameter corresponding to the index 1 in the second category according to the index, then the UE will further search for an access control parameter corresponding to the index 3 in the first category according to the index, and if a corresponding access control parameter is found, then the UE will enforce access control according to the access control parameter; otherwise, the UE will be allowed for an access.

Figure 3:
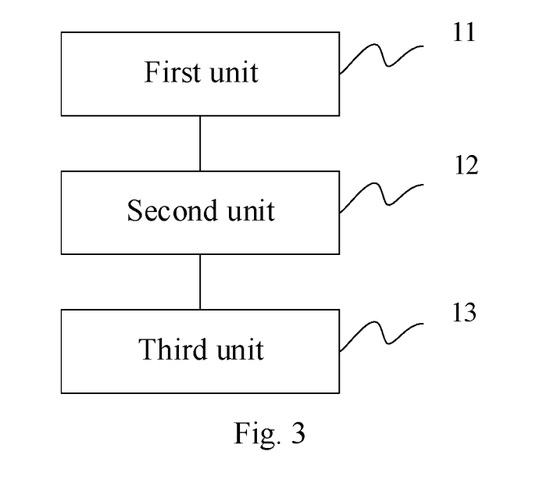
FIG. 3 is a schematic structural diagram of an access control device at the UE side according to an embodiment of the invention.

As illustrated in FIG. 3, in correspondence to the method above at the UE side, an embodiment of the invention provides an access control device including: a first unit 11 configured to determine an access control group set including access control object information of a UE; a second unit 12 configured to determine an access control parameter corresponding to the access control group set; and a third unit 13 configured to enforce access control according to the access control parameter.

Optionally, if the second unit 12 does not determine any access control parameter corresponding to the access control group set according to the access control group set, then the third unit 13 will allow the UE for an access.

Optionally, the access control group set includes the following access control object information: an access control group index representing an access control object.

Optionally, the first unit 11 determines the access control group index in one or a combination of following approaches: determining an access control group index of a current access control object according to a predefined access control group index corresponding to an access control object; or obtaining a correspondence relationship between an access control object and an access control group index from a network side, and determining an access control group index of a current access control object according to the correspondence relationship.

Optionally, the predefined access control group index corresponding to the access control object is specified in a protocol, or configured in a Universal Subscriber Identity Module (USIM) of the UE side.

Optionally, the first unit 11 is an Access Stratum (AS) of the UE.

The AS determines the access control group index of the current access control object according to a predefined access control group index corresponding to an access control object.

Or, the AS obtains a correspondence relationship between an access control object and an access control group index from a network side, and determines the access control group index of the current access control object according to the correspondence relationship.

Or, a higher layer of the UE determines the access control group index of the current access control object according to a predefined access control group index corresponding to an access control object, and transmits the access control group index of the current access control object to the AS of the UE.

Or, a higher layer of the UE obtains a correspondence relationship between an access control object and an access control group index from the network side, determines the access control group index of the current access control object according to the correspondence relationship, and transmits the access control group index of the current access control object to the AS of the UE.

Optionally, the access control group set further includes one or a combination of the following access control object information: a PLMN of the UE; an RRC state of the UE; a network slice of the UE; an access class of the UE; or a device type of the UE.

Optionally, the second unit 12 determines the access control parameter corresponding to the access control group set according to a pre-stored correspondence relationship between an access control group set and an access control parameter.

Optionally, the correspondence relationship is obtained by the second unit 12 from the network side.

Optionally, when the first unit 11 determines a plurality of access control group indexes, if the second unit 12 determines an access control parameter corresponding to an access control group index with the highest priority in a preset priority order, then the third unit 13 will allow the UE for an access, or if there is no access control parameter corresponding to the access control group index with the highest priority, then the second unit 12 will further determine whether there is an access control parameter corresponding to another access control group index, and if so, then the third unit 13 will enforce access control according to the determined access control parameter.

Or, if the second unit 12 determines a corresponding access control parameter for each determined access control group index, then the third unit 13 will enforce access control according to each determined access control parameter.

Or, if the second unit 12 does not determine any corresponding access control parameter for each determined access control group index, then the third unit 13 will allow the UE for an access.

Optionally, if the access control group indexes are categorized into several categories, then the preset priority order will be a priority order of the categories of the access control group indexes.

Figure 4:
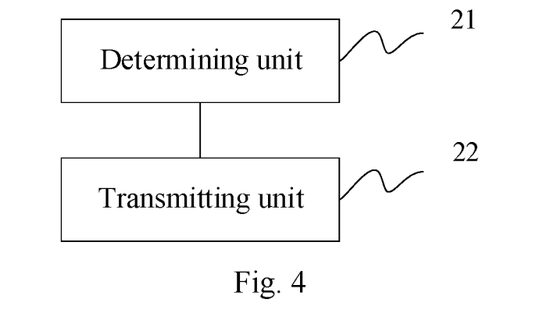
FIG. 4 is a schematic structural diagram of an access control device at the network side according to an embodiment of the invention.

As illustrated in FIG. 4, in correspondence to the method above at the network side, an access control device according to an embodiment of the invention includes: a determining unit 21 configured to determine a correspondence relationship between an access control group set including access control object information of a UE, and an access control parameter; and a transmitting unit 22 configured to transmit information about the correspondence relationship to the UE.

Optionally, the transmitting unit 22 is configured to transmit the information about the correspondence relationship to the UE by: transmitting the correspondence relationship to the UE; or transmitting an access control parameter corresponding to each access control group set respectively to the UE according to a default arrangement pattern of access control group sets.

Optionally, the transmitting unit 22 is further configured to transmit a correspondence relationship between an access control object of the UE, and an access control group index to the UE; where at least one access control object corresponds to a group of access control group indexes.

Optionally, the correspondence relationship between an access control object of the UE and an access control group index is determined by the transmitting unit according to a pre-configuration, or obtained from an Operation, Administration, and Maintenance (OAM) entity, and transmitted to the UE.

Figure 5:
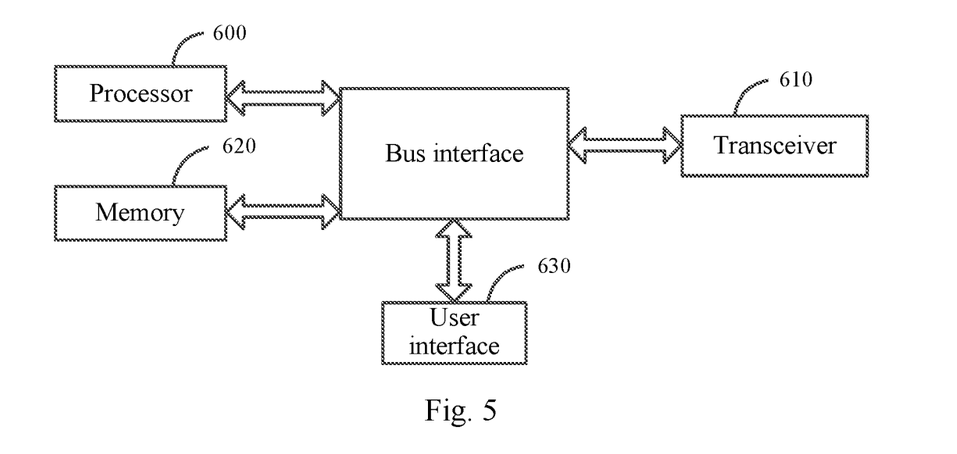
FIG. 5 is a schematic structural diagram of another access control device at the UE side according to an embodiment of the invention.

As illustrated in FIG. 5, a second access control device at the UE side according to an embodiment of the invention includes a processor 600 configured to read and execute programs in a memory 620 to: determine an access control group set including access control object information of a UE; determine an access control parameter corresponding to the access control group set; and enforce access control according to the access control parameter.

Optionally, the access control group set includes the access control object information which is an access control group index representing an access control object.

Optionally, the processor 600 determines the access control group index in one or a combination of following approaches: determining an access control group index of a current access control object according to a predefined access control group index corresponding to an access control object; or obtaining a correspondence relationship between an access control object and an access control group index from a network side, and determining an access control group index of a current access control object according to the correspondence relationship.

Optionally, the predefined access control group index corresponding to the access control object is specified in a protocol, or configured in a Universal Subscriber Identity Module (USIM) of the UE side.

Optionally, the processor 600 is an Access Stratum (AS) of the UE.

The AS determines the access control group index of the current access control object according to a predefined access control group index corresponding to an access control object.

Or, the AS obtains a correspondence relationship between an access control object and an access control group index from a network side, and determines the access control group index of the current access control object according to the correspondence relationship.

Or, a higher layer of the UE determines the access control group index of the current access control object according to a predefined access control group index corresponding to an access control object, and transmits the access control group index of the current access control object to the AS of the UE.

Or, a higher layer of the UE obtains a correspondence relationship between an access control object and an access control group index from the network side, determines the access control group index of the current access control object according to the correspondence relationship, and transmits the access control group index of the current access control object to the AS of the UE.

Optionally, the access control group set further includes one or a combination of the following access control object information: a PLMN of the UE; an RRC state of the UE; a network slice of the UE; an access class of the UE; or a device type of the UE.

Optionally, the access control group set further includes the following access control object information: a PLMN corresponding to the UE, and an RRC state corresponding to the UE; and if the processor 600 does not determine any access control parameter corresponding to the access control group set according to the access control group set, then the processor 600 will allow the UE for an access.

Optionally, the processor 600 determines the access control parameter corresponding to the access control group set according to a pre-stored correspondence relationship between an access control group set and an access control parameter.

Optionally, the correspondence relationship is obtained by the processor 600 from the network side.

Optionally, when the processor 600 determines a plurality of access control group indexes, if the processor 600 determines an access control parameter corresponding to an access control group index with the highest priority in a preset priority order, then the processor 600 will allow the UE for an access, or if there is no access control parameter corresponding to the access control group index with the highest priority, then the processor 600 will further determine whether there is an access control parameter corresponding to another access control group index, and if so, then the processor 600 will enforce access control according to the determined access control parameter.

Or, if the processor 600 determines a corresponding access control parameter for each determined access control group index, then the processor 600 will enforce access control according to each determined access control parameter.

Or, if the processor 600 does not determine any corresponding access control parameter for each determined access control group index, then the processor 600 will allow the UE for an access.

Optionally, if the access control group indexes are categorized into several categories, then the preset priority order will be a priority order of the categories of the access control group indexes.

The transceiver 610 is configured to receive and transmit data under the control of the processor 600.

Here in FIG. 5, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipment, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

Optionally, the processor 600 can be a Central Processing Unit (CPU), an Application Specific Integrated Circuit (ASIC), a Field-Programmable Gate Array (FPGA), or a Complex Programmable Logic Device (CPLD).

Figure 6:
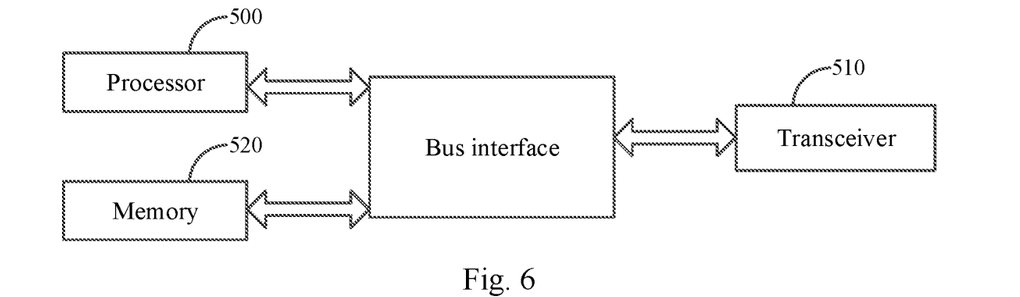
FIG. 6 is a schematic structural diagram of another access control device at the network side according to an embodiment of the invention.

As illustrated in FIG. 6, a second access control device at the network side according to an embodiment of the invention includes a processor 500 configured to read and execute programs in a memory 520 to: determine a correspondence relationship between an access control group set including access control object information of a UE, and an access control parameter; and transmit information about the correspondence relationship to the UE through a transceiver 510.

Optionally, the processor 500 is configured to transmit the information about the correspondence relationship to the UE through the transceiver 510 by: transmitting the correspondence relationship to the UE through the transceiver 510; or transmitting an access control parameter corresponding to each access control group set respectively to the UE through the transceiver 510 according to a default arrangement pattern of access control group sets.

Optionally, the processor 500 is further configured to: transmit a correspondence relationship between an access control object of the UE, and an access control group index to the UE; where at least one access control object corresponds to a group of access control group indexes.

Optionally, the correspondence relationship between an access control object of the UE and an access control group index is determined by the processor 500 according to a pre-configuration, or obtained from an Operation, Administration, and Maintenance (OAM) entity and transmitted to the UE, through the transceiver 510.

The transceiver 510 is configured to receive and transmit data under the control of the processor 500.

Here in FIG. 6, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

Optionally, the processor 500 can be a Central Processing Unit (CPU), an Application Specific Integrated Circuit (ASIC), a Field-Programmable Gate Array (FPGA), or a Complex Programmable Logic Device (CPLD).

In summary, in the embodiments of the invention, the AS of the UE searches for a corresponding access control parameter according to an obtained access control group set, and further makes an access control decision accordingly, thus resulting in a uniform, simple, and highly extensible access control mechanism.

An embodiment of the invention provides a readable storage medium which is a nonvolatile storage medium including program codes configured, upon being executed on a computing device, to cause the computing device to perform the operations of the UE in the system above.

An embodiment of the invention provides a readable storage medium which is a nonvolatile storage medium including program codes configured, upon being executed on a computing device, to cause the computing device to perform the operations at the network side in the system above.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An access control method, comprising:

determining, by a User Equipment (UE), an access control group set comprising access control object information;

determining, by the UE, an access control parameter corresponding to the access control group set; and enforcing, by the UE, access control according to the access control parameters;

wherein the access control group set comprises the access control object information which is an access control group index representing an access control object; and the UE determines the access control group index in one or a combination of following approaches:

an Access Stratum (AS) of the UE determines an access control group index of a current access control object according to a predefined access control group index corresponding to an access control object; or an Access Stratum (AS) of the UE obtains a correspondence relationship between an access control object and an access control group index from a network side, and determines an access control group index of a current access control object according to the correspondence relationship; or a higher layer of the UE determines an access control group index of a current access control object according to a predefined access control group index corresponding to an access control object, and transmits the access control group index of the current access control object to an Access Stratum (AS) of the UE; or a higher layer of the UE obtains a correspondence relationship between an access control object and an access control group index from a network side, determines an access control group index of a current access control object according to the correspondence relationship, and transmits the access control group index of the current access control object to an Access Stratum (AS) of the UE;

the predefined access control group index corresponding to the access control object is specified in a protocol, or configured in a Universal Subscriber Identity Module (USIM).

2. The method according to claim 1, wherein the method further comprises:
if the UE does not determine any access control parameter corresponding to the access control group set according to the access control group set, then the UE is allowed for an access.

3. The method according to claim 1, wherein the access control group set further comprises one or a combination of:
a Public Land Mobile Network (PLMN) of the UE;
a Radio Resource Control (RRC) state of the UE;
a network slice of the UE;
an access class of the UE; or
a device type of the UE.

4. The method according to claim 1, wherein the UE determines the access control parameter corresponding to the access control group set according to a pre-stored correspondence relationship between an access control group set and an access control parameter; wherein the correspondence relationship is obtained by the UE from a network side.

5. The method according to claim 1, wherein when the UE determines a plurality of access control group indexes, if the UE determines an access control parameter corresponding to an access control group index with a highest priority in a preset priority order, then the UE is allowed for an access, or if there is no access control parameter corresponding to the access control group index with the highest priority, then the UE further determines whether there is an access control parameter corresponding to another access control group index, and if so, then the UE enforces access control according to the determined access control parameter; wherein the access control group indexes are categorized into several categories in advance, and the preset priority order is a priority order of the categories of the access control group indexes; or
if the UE determines a corresponding access control parameter for each determined access control group index, then the UE enforces access control according to the determined access control parameter; or
if the UE does not determine any corresponding access control parameter for each determined access control group index, then the UE is allowed for an access.

6. The method according to claim 1, wherein different access control group indexes are allocated for different access control objects in advance in one or a combination of following approaches:
different access control objects are grouped and allocated with different access control group indexes according to different communication trigger types;
different access control objects are grouped and allocated with different access control group indexes according to different types of services;
different access control objects are grouped and allocated with different access control group indexes according to different types of data bearers; or
different access control objects are grouped and allocated with different access control group indexes according to different service port numbers or different Transmission Control Protocol (TCP) port numbers.

7. An access control method, comprising:
determining, by a network side, a correspondence relationship between an access control group set comprising access control object information of a User Equipment (UE), and an access control parameter; and
transmitting, by the network side, information about the correspondence relationship to the UE;
wherein the method further comprises:
transmitting, by the network side, a correspondence relationship between an access control object of the UE, and an access control group index to the UE;
wherein the correspondence relationship between an access control object of the UE, and an access control group index is obtained from an Operation, Administration, and Maintenance (OAM) entity, and transmitted to the UE by the base station of the network side; and
wherein at least one access control object corresponds to a group of access control group indexes.

8. An access control device, comprising: a processor, a memory, and a transceiver, wherein the processor is configured to read and execute programs in the memory to:
determine an access control group set comprising access control object information of a User Equipment (UE);
determine an access control parameter corresponding to the access control group set; and
enforce access control according to the access control parameter;
wherein the access control group set comprises the access control object information which is an access control group index representing an access control object; and
the processor is an Access Stratum (AS) of the UE; and the processor determines the access control group index in one or a combination of following approaches:
the AS determines the access control group index of the current access control object according to a predefined access control group index corresponding to an access control object; or
the AS obtains a correspondence relationship between an access control object and an access control group index from a network side, and determines the access control group index of the current access control object according to the correspondence relationship; or
a higher layer of the UE determines the access control group index of the current access control object according to a predefined access control group index corresponding to an access control object, and transmits the access control group index of the current access control object to the AS of the UE; or
a higher layer of the UE obtains a correspondence relationship between an access control object and an access control group index from a network side, determines the access control group index of the current access control object according to the correspondence relationship, and transmits the access control group index of the current access control object to the AS of the UE;
the predefined access control group index corresponding to the access control object is specified in a protocol, or configured in a Universal Subscriber Identity Module (USIM) of a UE side.

9. The device according to claim 8, wherein if the processor does not determine any access control parameter corresponding to the access control group set according to the access control group set, then the processor allows the UE for an access.

10. The device according to claim 8, wherein the access control group set further comprises one or a combination of:
a Public Land Mobile Network (PLMN) of the UE;
a Radio Resource Control (RRC) state of the UE;
an access class of the UE;
a network slice of the UE; or
a device type of the UE.

11. The device according to claim 8, wherein the processor determines the access control parameter corresponding to the access control group set according to a pre-stored correspondence relationship between an access control group set and an access control parameter; wherein the correspondence relationship is obtained by the processor from a network side.

12. The device according to claim 8, wherein when the processor determines a plurality of access control group indexes, if the processor determines an access control parameter corresponding to an access control group index with a highest priority in a preset priority order, then the processor allows the UE for an access, or if there is no access control parameter corresponding to the access control group index with the highest priority, then the processor further determines whether there is an access control parameter corresponding to another access control group index, and if so, then the processor enforces access control according to the determined access control parameter; wherein the access control group indexes are categorized into several categories, and the preset priority order is a priority order of the categories of the access control group indexes; or if the processor determines a corresponding access control parameter for each determined access control group index, then the processor enforces access control according to the determined access control parameter; or if the processor does not determine any corresponding access control parameter for each determined access control group index, then the processor allows the UE for an access.

13. The device according to claim 8, wherein access control objects represented by access control group indexes are preset in advance in one or a combination of following approaches:

different access control objects are grouped and allocated with different access control group indexes according to different communication trigger types;

different access control objects are grouped and allocated with different access control group indexes according to different types of services;

different access control objects are grouped and allocated with different access control group indexes according to different types of data bearers; or different access control objects are grouped and allocated with different access control group indexes according to different service port numbers or different Transmission Control Protocol (TCP) port numbers.

14. An access control device, comprising: a processor, a memory, and a transceiver, wherein the processor is configured to read and execute programs in the memory to:

determine a correspondence relationship between an access control group set comprising access control object information of a User Equipment (UE), and an access control parameter; and transmit information about the correspondence relationship to the UE through the transceiver;

wherein the processor is further configured to:

transmit a correspondence relationship between an access control object of the UE, and an access control group index to the UE;

wherein the correspondence relationship between an access control object of the UE, and an access control group index is obtained from an Operation, Administration, and Maintenance (OAM) entity, and transmitted to the UE by the processor; and wherein at least one access control object corresponds to a group of access control group indexes.

15. A non-transitory readable storage medium, comprising program codes configured to, upon being executed on a computing device, cause the computing device to perform the method according to claim 1.

16. A non-transitory readable storage medium, comprising program codes configured to, upon being executed on a computing device, cause the computing device to perform the method according to claim 7.

* * * * *